Feb. 10, 1925.
F. E. PERNOT
1,525,759
STORAGE BATTERY
Filed Sept. 18, 1920     2 Sheets-Sheet 1
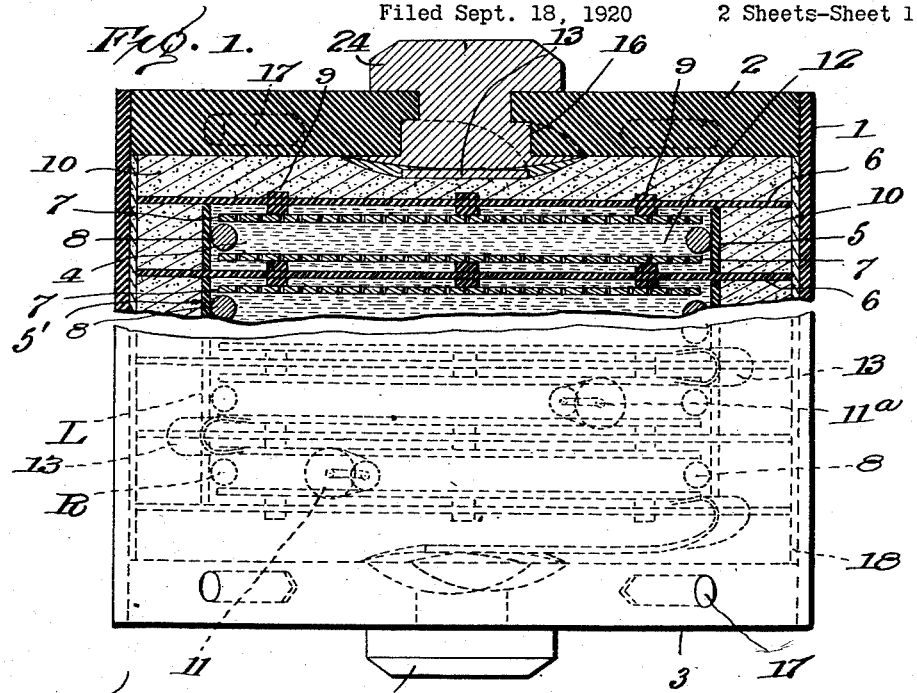
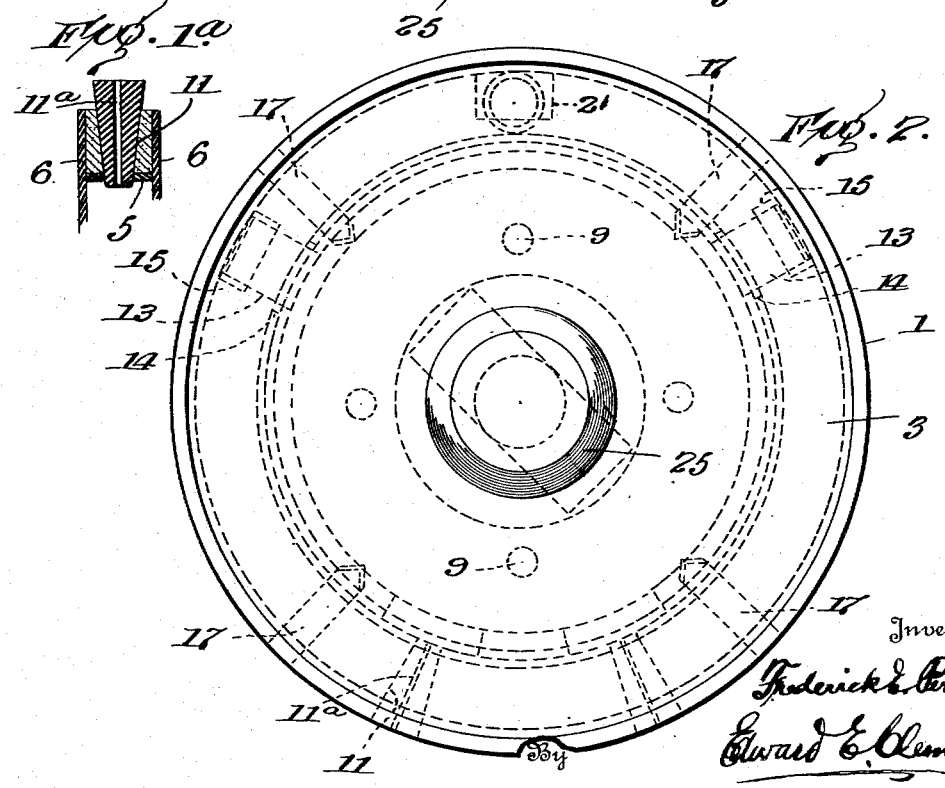
Inventor
Frederick E. Pernot
Edward E. Clement
Attorney Feb. 10, 1925.
F. E. PERNOT
STORAGE BATTERY
Filed Sept. 18, 1920    2 Sheets-Sheet 2
1,525,759
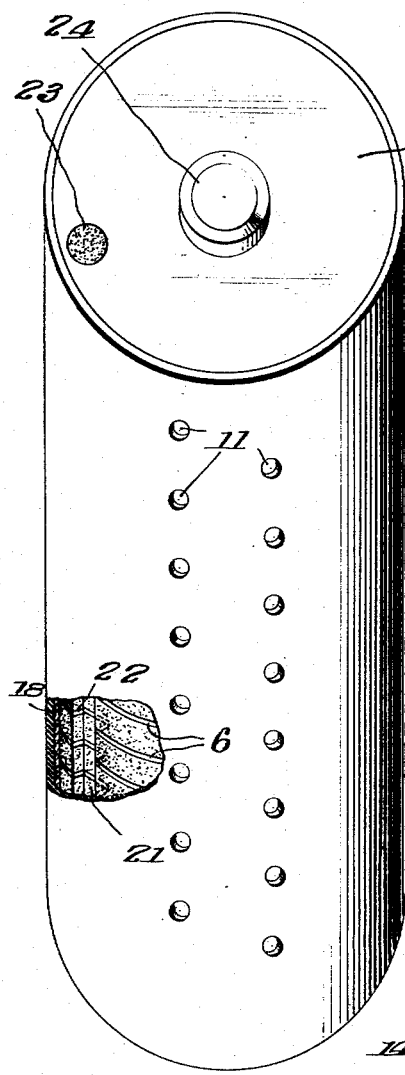
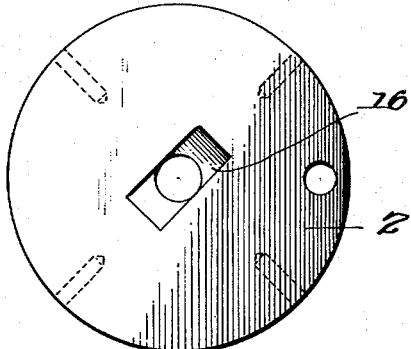
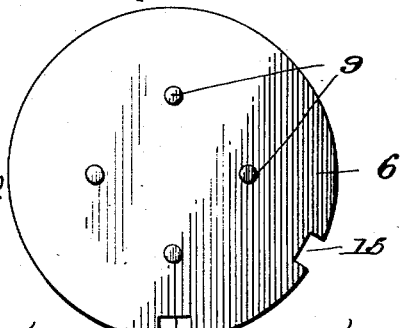
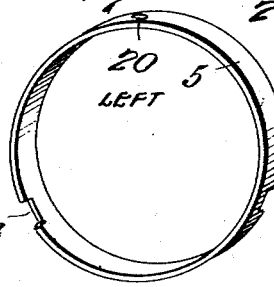
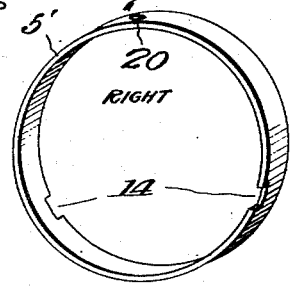
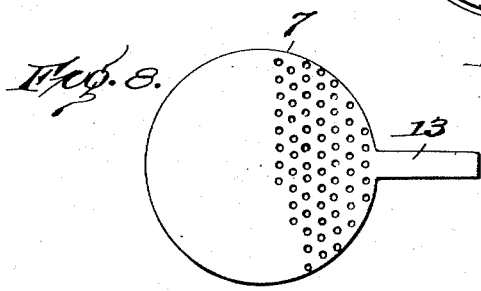
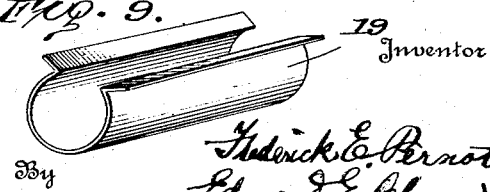

Patented Feb. 10, 1925.

1,525,759

UNITED STATES PATENT OFFICE.

FREDERICK E. PERNOT, OF WASHINGTON, DISTRICT OF COLUMBIA, ASSIGNOR TO ENGINEERS DEVELOPMENT COMPANY, OF WASHINGTON, DISTRICT OF COLUMBIA, A PARTNERSHIP COMPOSED OF FREDERICK E. PERNOT AND CARL KINSLEY.

STORAGE BATTERY.

Application filed September 18, 1920. Serial No. 411,090.

*To all whom it may concern:*

Be it known that I, FREDERICK E. PERNOT, a citizen of the United States, residing at Washington, in the District of Columbia, have invented certain new and useful Improvements in Storage Batteries, of which the following is a specification.

My invention relates to storage batteries, and has for its object the production of a unit battery of suitable characteristics for use in field work, such as radio transmission and the like. In such work it is imperative that liquid electrolytes be dispensed with, that the use of movable parts liable to displacement be avoided, and that all adjustments and electrical characteristics be fixed and permanent. An important end to be attained is that of rendering the cell or unit aggregation of cells non-hydroscopic, and to thereby avoid unexpected loss of efficiency which has hitherto been a deterrent to the development and use of the type of unit herein presented.

The invention herein described is in the nature of an improvement over a certain related invention which preceded it. According to such precedent invention, unit cells were assembled and clamped together with interposed separators of insulating material, (specifically polished hard rubber sheets), the plates of Planté type being perforated sheets of lead in couples, as usual, with terminals serially connected around the separators, each unit cell having a surrounding enclosure of polished hard rubber or equivalent, to confine the electrolytic material used in colloid or jelly form. The cells were sealed in suitable manner, as by the use of a well-known bituminous so-called "battery compound". In shape the unit battery was rectangular or substantially so, on all faces.

According to my improvement, the general form of the battery is cylindrical, with circular heads carrying the end terminals. The elements are circular perforated lead plates with radially projecting integral terminals, each cell has an enclosing ring of polished hard rubber, the cells are separated by circular discs also of polished hard rubber around the edges of which the lead terminals are serially connected, and the built-up aggregation of cells is enclosed in first a filling or coating of bituminous "battery compound" and then in a cylindrical container of hard rubber, polished, having heads carrying heavy end terminals, connected inside to the first and last plate terminals, respectively. I use the electrolyte indefinitely without renewal except to add moisture when required by means to be described and claimed herein.

It is to be noted that surface of the insulators is reduced to a minimum for the same content and for the required mass by making this battery cylindrical, and the plate surface area is raised to a maximum for the same periphery by making the elements, as they must be herein, circular.

My invention is illustrated in the accompanying drawings in which:

Fig. 1 is a side view, twice the actual size, partly broken away and partly in section through the axis of the assembled battery;

Fig. 1ª is a fragmentary section showing the core plug in position;

Fig. 2 is an end view of Fig. 1;

Fig. 3 is a perspective view of the assembled battery about actual size;

Fig. 4 is a plan view of one of the end plates;

Fig. 5 is a plan view of one of the partition diaphragms;

Figs. 6 and 7 are perspective views of a left and right hand cell-ring, respectively;

Fig. 8 is a plan view of a battery plate or element; and

Fig. 9 is a perspective view of the molding trough on a small scale.

Fig. 10, is a view, on a reduced scale, of the assemblage before placement in the outer casing.

Referring to the drawings in detail, the battery when assembled comprises the cylindrical shell 1, closed at the ends by the end plates 2 and 3, enclosing a plurality of battery cells 4 formed by the cell-rings 5 and discs 6.

Each cell 4 contains a pair of plates or elements 7 spaced apart by a separator ring 8 and spaced from the adjacent partitions by the spacing lugs 9. The entire group of cells 4 is surrounded and sealed by a filler 10 of bituminous material. For this material I employ at present a commercial compound known in the market as "battery compound". From each cell 4, a conical aperture 11 leads through the cell-ring 5, filler 10 and casing wall 1 to the outside. Each cell 4 is filled with a colloidal or gelatinous substance 12 containing the electrolyte. I do not claim this substance as my invention.

The battery units are connected in series through the terminals 13 which pass from one cell to another through the notches 14 and 15 in the cell-rings 5 and partitions 6, respectively, the terminals 13 of the extreme end plates being soldered or otherwise suitably electrically connected to the end or battery terminals 24 and 25. These battery terminals 24 and 25 are secured in the end plates 2 and 3 against longitudinal or rotary displacement by means of the rectangular off-set opening 16 indicated in Figs. 1 and 4.

The end plates 2 and 3 are held in the casing 1, by pins 17 extending radially therethrough. A filler 18, such as paraffin, having a melting point lower than that of the filler 10, is inserted between the body of the filler 10 and the cylindrical casing 1, filling all interstices. Both the bituminous and the paraffin fillers are non-hydroscopic.

In making the battery, the cells and battery elements are assembled in the trough 19, shown in Fig. 9, with the end plates 2 and 3 in place and the battery elements connected in series between the terminals 24 and 25 as indicated in Fig. 1. The trough 19 is then heated and while hot filled with bituminous battery compound 10 between the end plates 2 and 3, the compound insinuating itself into all the interstices between the walls of the trough and the assemblage of cells, suitable plugs of heat conducting material having been first inserted in the holes 20 of the cell-rings 5 and 5' as cores to form that portion of the conical openings 11 which passes through the body of the filler 10.

After the mass of battery compound has solidified, the whole assemblage is removed, the plugs taken out, and a channel or groove 21 is cut lengthwise along one side the assemblage now appearing as indicated in Fig. 10, the notches 22 in the partition diaphragms 6 having been lined up in assembling in the trough to allow the groove to be cut through in register with them, or the diaphragms 6 may be formed without the notches 22 and the groove 21 cut in the assemblage of diaphragms and the body of the molded battery compound.

The molded unit is now slipped into the cylindrical casing 1 of hard rubber polished inside and out, and melted paraffin or other non-hydroscopic material 18 of low melting point with respect to the bituminous compound is poured or forced through an opening 23 in one of the end plates registering with the channel 21 so as to completely fill all interstices and solidly hold the molded unit within the rubber sleeve.

The right and left hand cell-rings are alike in all respects except that the notches 14 are oppositely arranged in the different rings, that is, in the left hand rings, Fig. 6, the near notch is to the left and the far notch is to the right, and vice versa, for the right hand rings, Fig. 7. By thus forming the cell-rings and using alternate right and left hand rings in the battery assemblage, the connections 13 between the cells can be staggered as indicated in Figs. 1 and 2.

During the pouring of the material 18, the plugs or cores, which are preferably made of zinc each with a small hole or channel 11ª through it from end to end to permit the escape of gases, are re-inserted through the casing 1 into the holes 20 of the cell-rings to preserve the continuity of the charging channels 11.

The solid parts of the battery being thus completed, the plugs or cores are removed from the channels 11. This is done in every case by means of a heated tool such as hot pliers. The battery cells are then filled through the openings 11 with a colloidal or gelatinous substance containing a suitable electrolyte. These openings 11 also serve as means for supplying moisture to the cells after assembly.

I claim as part of my invention herein the openings through the jacket or embedment into the several cells, but not the plugs described for forming the same. I do not claim as my invention the paraffin or other supplemental filling equivalent thereto.

What I claim is:

1. A storage battery comprising a series of lead discs with ring separators to space them apart in pairs, a set of non-hydroscopic insulating discs of larger diameter than the plates and separators interposed between the respective pairs to form closed cells each containing a pair of plates with an interposed separator, electrolytic material in each cell, and an insulating enclosure sealing and binding all the cell units into a solid mass, with end terminals carried on the insulating enclosure and electrically connected with the first and last cell terminals, respectively.

2. A storage battery as described in claim 1, in which the individual terminals of successive cells are united around the edges of the cell-separating discs, positive and negative terminals being matched in adjacent cells but the positive and negative terminals of the same cell being spaced apart angularly.

3. A storage battery as described in claim 1 in which the individual terminals of successive cells are united around the edges of the cell-separating discs, positive and negative terminals being matched in adjacent cells but the positive and negative terminals of the same cell being spaced apart angularly, and in which also the cell terminals are spaced right and left alternately, whereby the united terminals will be staggered back and forth down the side of the cylindrical assembly.

4. A built-up unit storage battery comprising a series of plates, a series of single insulating discs separating the plates in opposed pairs or couples, separators or spacers between the plates of each pair, and an insulating mass enveloping and binding all the cells thus formed into one solid unit.

5. A storage battery as described in claim 4 in which the unit mass is enclosed within an outside sleeve which acts not only as an insulator but as a support for the whole battery.

6. A storage battery of the type described in claim 1, having a plurality of connected cells enclosed as a unit within a unitary mass of non-hydroscopic insulating material.

7. A storage battery as described in claim 1 in which the enclosure is polished hard rubber and all surfaces of insulators exposed to acid or moisture are polished hard rubber to prevent creeping and short-circuiting.

8. A storage battery of the type described in claim 1 in which all plate terminals are completely and permanently enclosed or embedded in a unitary mass of insulating material.

9. A storage battery as described in claim 1 in which the unpaired terminals of the first and last cell are connected to separately supported end terminals and such connections are also embedded and enclosed within the insulating mass.

10. A multiple cell storage battery of the type described in claim 1 built up of circular plates, separators and insulators to form a unitary cylindrical mass.

11. A storage battery of the type described in claim 1, having unit cells, end plates, and insulating filling embedding and covering all plate terminals and the end plate connections.

12. A multiple cell storage battery of the unitary type described in claim 1 having a common non-hydroscopic jacket.

In testimony whereof I affix my signature.

FREDERICK E. PERNOT.